United States Patent
Maass et al.

(10) Patent No.: US 11,078,077 B2
(45) Date of Patent: Aug. 3, 2021

(54) METHOD FOR PRODUCING SYNTHESIS GAS

(71) Applicants: THYSSENKRUPP INDUSTRIAL SOLUTIONS AG, Essen (DE); thyssenkrupp AG, Essen (DE)

(72) Inventors: Hans-Jürgen Maass, Dresden (DE); Volker Göke, Geretsried (DE); Otto Machhammer, Mannheim (DE); Andreas Bode, Mannheim (DE); Grigorios Kolios, Neustadt (DE); Karsten Büker, Dortmund (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 442 days.

(21) Appl. No.: 15/779,596

(22) PCT Filed: Nov. 28, 2016

(86) PCT No.: PCT/EP2016/025155
§ 371 (c)(1),
(2) Date: May 29, 2018

(87) PCT Pub. No.: WO2017/092873
PCT Pub. Date: Jun. 8, 2017

(65) Prior Publication Data
US 2018/0273380 A1  Sep. 27, 2018

(30) Foreign Application Priority Data
Dec. 1, 2015  (DE) ............... 10 2015 015 531.8

(51) Int. Cl.
*C01B 3/34*  (2006.01)
*C01B 3/30*  (2006.01)
(Continued)

(52) U.S. Cl.
CPC .............. *C01B 3/344* (2013.01); *C01B 3/30* (2013.01); *C10G 2/32* (2013.01); *C10K 3/02* (2013.01);
(Continued)

(58) Field of Classification Search
CPC ....................................................... C01B 3/344
See application file for complete search history.

(56) References Cited

U.S. PATENT DOCUMENTS

| | | |
|---|---|---|
| 2008/0081844 A1 | 4/2008 | Shires |
| 2014/0217327 A1* | 8/2014 | Mass ........... C01B 3/344 252/373 |

(Continued)

FOREIGN PATENT DOCUMENTS

| | | |
|---|---|---|
| CN | 101717073 A | 6/2010 |
| EP | 0191522 A | 8/1986 |

(Continued)

OTHER PUBLICATIONS

Xun Wang, Tianjiao Wang; "Hydrogen amplification from coke oven gas using a CO2 adsorption enhanced hydrogen amplification reactor", International Journal of Hydrogen Energy 37, (2012) pp. 4974-4986.

(Continued)

*Primary Examiner* — Douglas B Call
(74) *Attorney, Agent, or Firm* — thyssenkrupp North America, LLC

(57) ABSTRACT

A method for producing synthesis gas may involve introducing a hydrocarbon-containing coke-oven gas and a carbon dioxide-containing converter gas into a first reaction zone where hydrogen present in the hydrocarbon-containing coke-oven gas reacts at least partly with carbon dioxide to form water, which reacts thermally with hydrocarbon to form synthesis gas containing carbon monoxide and hydro- (Continued)

gen. The method may further involve introducing an oxygen-containing gas in a second reaction zone, and using the oxygen-containing gas and some hydrogen from the first reaction zone to produce thermal energy. Still further, the method may involve supplying the thermal energy produced in the second reaction zone to the first reaction zone.

15 Claims, 1 Drawing Sheet

(51) Int. Cl.
*C10K 3/02* (2006.01)
*C10G 2/00* (2006.01)

(52) U.S. Cl.
CPC .............. *C01B 2203/0216* (2013.01); *C01B 2203/0255* (2013.01); *C01B 2203/0272* (2013.01); *C01B 2203/0485* (2013.01); *C01B 2203/085* (2013.01); *C01B 2203/0822* (2013.01); *C01B 2203/0844* (2013.01); *C01B 2203/1241* (2013.01); *C01B 2203/1247* (2013.01); *C01B 2203/1252* (2013.01); *C01B 2203/1258* (2013.01); *C01B 2203/142* (2013.01); *C01B 2203/82* (2013.01)

(56) References Cited

U.S. PATENT DOCUMENTS

| | | | |
|---|---|---|---|
| 2015/0099294 A1 | 4/2015 | Young | |
| 2015/0336795 A1* | 11/2015 | Kern | C01B 3/38 252/373 |
| 2016/0068390 A1* | 3/2016 | Schneider | C01B 3/344 431/5 |

FOREIGN PATENT DOCUMENTS

| | | |
|---|---|---|
| WO | 2013004391 A | 1/2013 |
| WO | 2014095661 A | 6/2014 |
| WO | 2014097142 A | 6/2014 |

OTHER PUBLICATIONS

Fujian Sangang (Group) Sanming Chemical Co., Ltd., "Application of coke-oven gas after atmospheric pressure non-catalytic conversion added with converter gas to produce syngas", Sanming 365000; Fujian P.R.C.—Article No. 1004-9932(2014).

English Translation of International Search Report issued in PCT/EP2016/025155, dated Feb. 10, 2017 (dated Feb. 17, 2017).

* cited by examiner

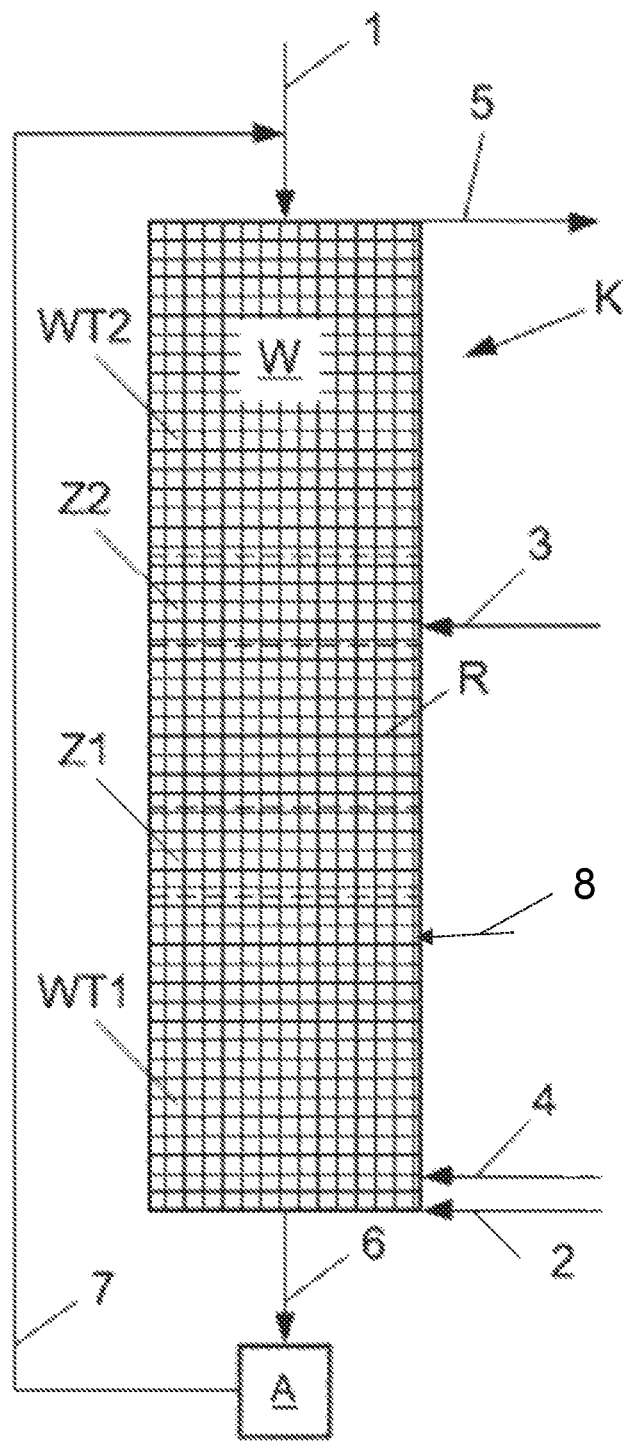

METHOD FOR PRODUCING SYNTHESIS GAS

CROSS REFERENCE TO RELATED APPLICATIONS

This application is a U.S. National Stage Entry of International Patent Application Serial Number PCT/EP2016/025155, filed Nov. 28, 2016, which claims priority to German Patent Application No. DE 10 2015 015 531.8, filed Dec. 1, 2015, the entire contents of both of which are incorporated herein by reference.

FIELD

The present disclosure generally relates to synthesis gas, including methods for producing synthesis gas.

BACKGROUND

Synthesis gas is understood to mean a mixture of substances containing hydrogen and carbon monoxide which may be used as the base chemical in a plurality of industrial processes. For example synthesis gas is used for the production of methanol, dimethyl ether or hydrocarbons.

A method of the generic type is known from patent application WO 2014097142. It is proposed in the application to pass the hydrogen formed in the first reaction zone having a temperature lying between 800 and 1,400° C. into the second reaction zone to utilize its heat content for the conversion from hydrogen to carbon dioxide. However, this technology is not suitable for the use of coke-oven gas and converter gas, since the reverse water-gas shift reaction proceeds in a reactor with a catalyst. However, the latter would have only a low service life due to the contaminants of the coke-oven gas and of the converter gas. In addition, heat integration is not optimal due to the execution of the reverse water-gas shift reaction in a separate reactor.

Coke-oven gas is understood to mean a hydrogen-rich and/or methane-rich mixture of substances which is produced, inter alia, during operation of a coke oven. On the other hand, converter gas is understood to mean a carbon monoxide-rich and/or carbon dioxide-rich mixture of substances, as is produced in particular when operating a steelworks. Both substances are also designated as smelter gases or blast furnace gases, which is understood to mean in particular a mixture of coke-oven gas and converter gas. Since coke-oven gases and converter gases are gas mixtures which additionally contain contaminants, for example sulfur compounds, these gases hitherto had to be purified in costly manner before their use, apart from simple use as fuel, and separated into their constituents. This is effected mostly in catalytic and/or adsorptive methods.

Thus a need exists for methods for producing synthesis gas from smelter gases, in which effective utilization of heat is guaranteed in the reactor.

BRIEF DESCRIPTION OF THE FIGURE

FIG. 1 is a schematic view depicting an example method in which a reactor is used, through the reaction chamber of which a moving bed of a granular solid is passed, which moving bed comprises a first and a second reaction zone as well as a first and second heat-exchange zone.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a method for producing synthesis gas may involve introducing a hydrocarbon-containing coke-oven gas and a carbon dioxide-containing converter gas into a first reaction zone and reacting hydrogen present in the hydrocarbon-containing coke-oven gas at least partly with carbon dioxide to form water, which is reacted thermally with the hydrocarbon to form synthesis gas containing carbon monoxide and hydrogen. Furthermore, in a second reaction zone an oxygen-containing gas may be introduced, using the latter and some of the hydrogen from the first reaction zone to produce thermal energy.

Furthermore, in some examples the thermal energy produced in the second reaction zone is supplied to the first reaction zone.

The effective utilization of heat comprises both the supply of heat from the second reaction zone to the first reaction zone to make available the necessary energy for the endothermic reactions proceeding there, and heat exchange through particular heat-exchange zones at the input and output of the reactor. There, the entering and emerging gases are in direct heat exchange with a solid.

In addition to effective utilization of heat in the reactor, an additional advantage of this method is that the smelter gases may be used without complete purification or separation. Contaminants in the coke-oven gas and/or converter gas, in particular longer-chain and/or cyclic hydrocarbons, such as benzene, toluene, ethylbenzene, xylene, naphthalene or tar, which occur in particular in coke-oven gas, are decomposed by the reaction conditions prevailing in the reaction zones, inter alia, to form carbon and hydrogen. The reaction temperatures preferably lie at 1,000 to 1,800° C. and in particular at 1,200 to 1,400° C. Hence, it is preferred if sulfur-containing contaminants are removed from the gas mixture for the introduction of the coke-oven gas into the reactor. Suitable methods for this are known to the expert. Hence, particularly pure carbon, which is removed via the solid, would be produced. However, separating-off of the sulfur-containing compounds from the gaseous product stream is likewise possible.

The hydrocarbons or the carbon dioxide no longer have to be separated off and purified before introduction into the reactor.

In a method of the invention, predominantly a reverse water-gas shift reaction of the hydrogen and of the carbon dioxide from the hydrocarbon-containing coke-oven gas and the carbon dioxide-containing converter gas takes place in the first reaction zone to form carbon monoxide and water. The water then reacts with the hydrocarbon of the gases used in thermal steam reforming and thus preferably with methane in methane reforming to form hydrogen and carbon monoxide. Thermal decomposition of the hydrocarbons from the hydrocarbon-containing coke-oven gas and the carbon dioxide-containing converter gas may likewise take place. That is, the hydrocarbon, in particular the methane, are decomposed to form hydrogen and carbon. The method of the invention permits execution of the reactions proceeding in the first reaction zone largely independently of other reactions, and hence monitoring of them comparatively easily and well. For example the quantity of reacted hydrocarbon may be set and hence in particular the quantity of the hydrogen produced in the first reaction zone may be controlled first and foremost via the temperature. If full conversion should not take place, the temperature may be reduced and the hydrocarbons in the hydrocarbon-containing gas that are used are only partly decomposed in the first reaction zone. The reactions proceed both in parallel and one after another.

The hydrogen, the carbon monoxide and the unreacted gases, if present, are then passed into the second reaction zone.

Oxidation or at least partial oxidation of hydrogen from the first reaction zone is advantageously executed using oxygen in the second reaction zone. The heat being produced by combustion is passed on via the moving bed to the first reaction zone to promote the endothermic reactions taking place there. The oxygen is supplied to the second reaction zone. A solid in granular form is used to transport the heat. The solid may be passed through the reactor as a moving fixed bed, that is, as a moving bed. If, due to pyrolytic decomposition of the hydrocarbons, carbon is also produced, it is deposited on the granular solid. To transport the thermal energy from the second to the first reaction zone, the moving bed is preferably moved from the second to the first reaction zone. The granular solid is advantageously recycled. All the energy required for thermal hydrocarbon decomposition is preferably supplied to the first reaction zone from the second reaction zone.

The synthesis gas being produced at the output of the reactor preferably contains hydrogen and carbon monoxide. However, unreacted gas constituents, in particular carbon dioxide or water formed, may also be present. The necessary purification methods depend on the later use of the synthesis gas and are known to the expert.

In addition, effective utilization of heat is effected in that at the upper end of the reactor, in a second heat-exchange zone, cold granular solid, which enters the reactor, is heated and the emerging gas stream is cooled. At the lower end of the reactor, in a first heat-exchange zone, the granular solid emerging from the reactor is cooled by the entering gas mixture and the latter is thus pre-heated.

The reaction zones and heat-exchange zones are usefully arranged in a reaction chamber executed as a vertical shaft so that the movement of the moving bed comes about solely due to the effect of gravity. The mode of operation may be continuous or quasi-continuous. Instead of a moving fixed bed, a fluidized bed is also conceivable. A moving bed differs from a fluidized bed due to the preferred movement direction or due to the flow rate of the particles and the particle size. In a moving bed, the particles are in direct contact with one another, whereas on the other hand in a fluidized bed, the particles if possible should not come in contact with one another.

The granular solid at the reactor inlet and outlet has almost ambient temperature, but at the most between 50 and 300° C. The maximum temperature is achieved in the second reaction zone and lies at 1,000 to 1,800° C., in particular at 1,200 to 1,400° C.

The gas emerging from the second reaction zone is advantageously run in counter-current to the moving bed and is thus cooled by the latter in direct heat exchange, in particular in a second heat-exchange zone. Equally, the hydrocarbon-containing coke-oven gas is preferably run in counter-current to the moving bed into the first reaction zone and is thus heated by the latter in direct heat exchange, in particular in a first heat-exchange zone. The gases may be withdrawn from the reaction chamber at a temperature between 50 and 500° C.

In the first reaction zone, carbon may be produced which is deposited on the granular solid of the fixed bed. In execution as a moving bed, carbon deposited on the granular solid is separated off downstream of the first reaction zone or the first heat-exchange zone and removed from the moving bed. The granular solid acts as a filter so that in particular hydrogen being produced, but also other gases, largely free of carbon particles, may be withdrawn from the first reaction zone and passed, for example into the second reaction zone. Carbon which reaches the second reaction zone in spite of the filter effect described reacts with the oxygen present there to form a carbon dioxide which forms some of the synthesis gas directly or after reverse water-gas shift reaction. The water being produced in the first reaction zone reacts under the prevailing reaction conditions rather in a homogeneous reaction with the hydrocarbons than in a heterogeneous reaction with the graphitic carbon from pyrolysis. However, even this side reaction would not be negative for a method of the invention, since the carbon is not the main product. In addition, no contaminants are produced by the reaction, but only carbon monoxide and hydrogen and thus are part of the synthesis gas.

It is even conceivable that to control the courses of the reaction and/or the product composition, water or steam is supplied to the first reaction zone.

A methane-rich gas, as produced in particular when operating a coke oven, is advantageously used as the hydrocarbon-containing coke-oven gas, and a carbon dioxide-containing converter gas, as produced in particular when operating a steelworks, is advantageously used. Both gases are often available in large quantities at the identical location.

The ratio of the gas quantity of the hydrocarbon-containing coke-oven gas to the carbon dioxide-containing converter gas is set between 0.5 and 3 to set a hydrogen to carbon monoxide ratio in the synthesis gas at the output of the reactor between 0.8 and 2.5. The desired ratio of hydrogen to carbon monoxide is dependent on how the synthesis gas is further processed.

If for example a hydrogen to carbon monoxide ratio of 2 is to be achieved, about double the quantity of coke-oven gas must be used compared to the converter gas.

If necessary, further hydrocarbons, in particular methane or natural gas, may preferably be added to the first reaction zone to set a hydrogen to carbon monoxide ratio in the synthesis gas at the output of the reactor between 0.8 and 2.5, or carbon dioxide may be added to the second reaction zone.

If the energy produced in the second reaction zone by oxidation of hydrogen (with $O_2$ addition) is not sufficient, the thermal energy in the second and/or first reaction zone may be produced by electric current. Hence, for example one or more electrically conductive heating elements may be arranged in a reaction zone so that they are directly or indirectly in thermal connection with the substances to be reacted. An electrically conductive heating element is arranged either to be fixed or movable within the reaction zone. For example the heating element may be part of a moving bed made of a granular, electrically conductive solid which is, for example carbon, which is moved through the reaction zone. In order to heat it, an electrically conductive heating element is connected to a current source, via which electric current is passed through the heating element. However, it is also possible to produce heat by electromagnetic induction. Hence, an induction coil, which provides a magnetic alternating field as soon as an electric alternating voltage is applied to it, is arranged outside of the two reaction zones. An electrically conductive heating element, which is electrically insulated from the induction coil, is arranged so that eddy currents, which lead to heating of the heating element due to the ohmic losses, may be induced in it by the magnetic alternating field. If the heating element consists of a ferromagnetic material, such as for example an iron-silicon alloy or an iron-nickel alloy or μ metal, furthermore magnetic losses contribute to heating of the heating element and hence to the formation of a temperature gradient between a heating element and its surroundings.

Corundum ($Al_2O_3$) or quartz glass ($SiO_2$) or mullite ($Al_2O_3.SiO_2$) or cordierite ($(Mg,Fe)_2(Al_2Si)[Al_2Si_4O_{18}]$) or steatite ($SiO_2.MgO.Al_2O_3$) or coal or coke or carbon produced in the method by thermal hydrocarbon decomposition is preferably used as the granular solid. However, a carbon-rich granulate, which is formed from solid particles consisting completely or predominantly of carbon which are present in a grain size of 0.5 to 80 mm, but preferably of 1 to 50 mm, is preferably used. Such a granulate may consist, for example completely or partly of coke breeze, which is not suitable for use in a blast furnace due to its small grain size. The granulate preferably consists of carbon which is produced in the method by thermal hydrocarbon decomposition and recycled.

Synthesis gas production of the invention may be executed without pressure or under pressure. It is preferably effected at pressures between 10 and 25 bar, particularly preferably—except for pressure losses—at the highest pressure under which the hydrocarbon-containing coke-oven gas is available for carbon recovery.

Summarizing, the advantages of the method of the invention lie in the fact that the smelter gases do not have to be subjected to expensive purification or separation before use. The already high $H_2$ content in the coke-oven gas and the high CO content in the converter gas reduces the required energy input for the endothermic reactions, relative to the $H_2$ yields, significantly by at least 25%, since in particular the hydrogen is already entrained as an energy carrier. Hence, lower reactor diameters and low circulating quantities for the solid may also be achieved. A further advantage is the effective utilization of heat. Hence, on the one hand the energy required for the endothermic reactions is produced directly within the reactor, that is in situ, and transferred between the reaction zones. On the other hand, the entering gas is heated directly and the emerging gas cooled by heat-exchange zones. In addition, side reactions, for example the Boudouard reaction of two carbon monoxide to form carbon and carbon dioxide, are suppressed due to the direct cooling of the product stream in the second heat-exchange zone.

In addition, the method runs purely thermally and without catalyst. Division of the reactor into two reaction zones is able to ensure that in the first reaction zone, no oxygen or hardly any oxygen is present so that there in particular pyrolysis takes place and combustion of hydrogen only in the second reaction zone.

Granular solid at ambient temperature is supplied to the reaction chamber R of reactor K via pipeline 1. The granular solid is, for example carbon produced in the method by thermal hydrocarbon decomposition. The granular solid is passed downwards in a moving bed W due to the effect of gravity. A hydrocarbon-containing gas 2, together with a carbon dioxide-containing gas 4, is passed from the bottom to the reaction chamber R and run upwards in counter-current through the moving bed W. The hydrocarbon-containing gas 2 and the carbon dioxide-containing gas 4, which have ambient temperature on entering the reaction chamber R, are heated on their path upwards in direct heat exchange, in a first heat-exchange zone WT1, by the moving bed W until they reach the decomposition temperature of the hydrocarbon in the first reaction zone Z1. In a particular embodiment, the gases may also be combined in the run-up to the reactor and be introduced together in a supply pipe.

A reaction of the carbon dioxide with the hydrogen to form carbon monoxide and water via a thermal reverse water-gas shift reaction is effected in the first reaction zone Z1 on entry of the gases. The water from this reaction, together with the hydrocarbon, in the preferred case methane, is reacted in an endothermic thermal decomposition reaction to form hydrogen and carbon dioxide. The carbon dioxide may then in turn be reacted with hydrogen to form carbon monoxide. Both reactions, the reverse water-gas shift reaction and thermal steam reforming, proceed both one after another and in parallel. Together with unreacted or only partly reacted hydrocarbon, the hot hydrogen formed flows into the second reaction zone Z2 arranged above the first. An oxygen-containing gas 3 is supplied in the second reaction zone Z2. The hydrogen, together with the oxygen, is at least partly combusted and thus provides the heat of reaction required for the production of synthesis gas. Alternatively or additionally, the heat of reaction may also be introduced into the second reaction zone Z2 via electric current. The water being produced during hydrogen combustion is transferred at least partly into the first reaction zone and may be reacted there. Incompletely reacted products of the first reaction zone Z1 may be reacted further in the second reaction zone Z2. The synthesis gas 5, which is cooled in counter-current to the moving bed W in a second heat-exchange zone WT2, is removed from the second reaction zone Z2. The synthesis gas 5 has a temperature between 50 and 500° C. at the upper end of reactor K, the output of the reactor.

At the lower end of reactor K, granular solid is removed via a discharge 6 or a discharge pipe 6 at a temperature lying close to the ambient temperature, or at least between 50 and 300° C., and supplied to a regeneration device A, in which the latter is regenerated, for example by removing the attached carbon or by comminution, sifting and grading, to be returned to the reaction chamber R again as recycled solid 7.

In a further preferred design of the invention, the hydrocarbon-containing gas 2 enters the moving bed at the lower end of the reactor so that first of all partial pyrolytic decomposition of the hydrocarbon, in particular of the methane, takes place to form carbon and hydrogen. The carbon is attached to the fixed bed, hence the quantity of circulating granular fixed bed may be kept constant. The carbon dioxide-containing gas 4 is supplied to the reactor only shortly before entry into the first reaction zone Z1, separated from the addition point of the hydrocarbon-containing gas 2.

LIST OF REFERENCE DESIGNATIONS

A Regeneration device
K Reactor
R Reaction chamber

W Moving bed
WT1 First heat-exchange zone
WT2 Second heat-exchange zone
Z1 First reaction zone
Z2 Second reaction zone
1 Supply of granular solid
2 Hydrocarbon-containing gas
3 Oxygen-containing gas
4 Carbon dioxide-containing gas
5 Synthesis gas
6 Discharge, especially discharge pipe, for granular solid
7 Recycled granular solid

What is claimed is:

1. A method for producing synthesis gas with a reactor comprising a first reaction zone and a second reaction zone, the method comprising:
   introducing, into the first reaction zone, the first reaction zone being free of a catalyst, a coke-oven gas comprising a hydrocarbon and a converter gas comprising carbon dioxide;
   reacting, the hydrocarbon with the carbon dioxide to form water;
   reacting the water, thermally with the hydrocarbon to form synthesis gas containing carbon monoxide and hydrogen;
   introducing, into the second reaction zone, an oxygen-containing gas and the hydrogen from the first reaction zone;
   producing thermal energy from the oxygen-containing gas and the hydrogen from the first reaction zone; and
   supplying the thermal energy produced in the second reaction zone to the first reaction zone.

2. The method of claim 1 comprising moving fixed bed comprising a granular solid from the second reaction zone to the first reaction zone.

3. The method of claim 2 comprising recycling the granular solid.

4. The method of claim 2 comprising:
   running the synthesis gas through the second reaction zone counter-current to the moving fixed bed and thus cooling the synthesis gas by passing the synthesis gas over the granular solid of the moving fixed bed; and
   running the coke oven gas and the converter gas counter-current to the moving fixed bed in the first reaction zone and thus heating the coke oven gas and the converter gas by passing the coke oven gas and the converter gas over the granular solid of the moving fixed bed.

5. The method of claim 2 comprising depositing carbon on the granular solid during said producing of thermal energy step, separating the deposited carbon from the granular solid, and removing the separated carbon from the moving fixed bed downstream of the first reaction zone.

6. The method of claim 2 wherein the granular solid is one or more of corundum ($Al_2O_3$), quartz glass ($SiO_2$), mullite ($Al_2O_3.SiO_2$), cordierite (($Mg,Fe)_2(Al_2Si)[Al_2Si_4O_{18}]$), steatite ($SiO_2.MgO.Al_2O_3$), coal, coke, or produced by thermal decomposition of the hydrocarbon.

7. The method of claim 1 further comprising supplying water or steam to the first reaction zone.

8. The method of claim 1 wherein the coke-oven gas comprises methane.

9. The method of claim 8 wherein the converter gas is produced from operation of a steelworks.

10. The method of claim 1 wherein the converter gas is produced from operation of a steelworks.

11. The method of claim 1 comprising adding additional hydrocarbons to the first reaction zone to set a hydrogen to carbon monoxide ratio in the synthesis gas at an output of the reactor between 0.8 and 2.5.

12. The method of claim 1 comprising adding methane to the first reaction zone to set a hydrogen to carbon monoxide ratio in the synthesis gas at an output of the reactor between 0.8 and 2.5.

13. The method of claim 1 comprising adding natural gas to the first reaction zone to set a hydrogen to carbon monoxide ratio in the synthesis gas at an output of the reactor between 0.8 and 2.5.

14. The method of claim 1 wherein the thermal energy in the second reaction zone is produced at least partially by electric current.

15. The method of claim 1 wherein the granular solid is one or more of corundum ($Al_2O_3$), quartz glass ($SiO_2$), mullite ($Al_2O_3.SiO_2$), cordierite (($Mg,Fe)_2(Al_2Si)[Al_2Si_4O_{18}]$), steatite ($SiO_2.MgO.Al_2O_3$), coal, coke, or produced by thermal decomposition of the hydrocarbon.

* * * * *